US012326459B2

(12) United States Patent
Yokota et al.

(10) Patent No.: US 12,326,459 B2
(45) Date of Patent: Jun. 10, 2025

(54) AUTOMATIC ANALYZER (71) Applicant: Hitachi High-Tech Corporation, Tokyo (JP)

(72) Inventors: Yuki Yokota, Tokyo (JP); Koshin Hamasaki, Tokyo (JP); Yoshihiro Yamashita, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 1063 days.

(21) Appl. No.: 17/277,373

(22) PCT Filed: Aug. 29, 2019

(86) PCT No.: PCT/JP2019/033908
§ 371 (c)(1),
(2) Date: Mar. 18, 2021

(87) PCT Pub. No.: WO2020/066449
PCT Pub. Date: Apr. 2, 2020

(65) Prior Publication Data
US 2022/0034929 A1 Feb. 3, 2022

(30) Foreign Application Priority Data
Sep. 25, 2018 (JP) .................. 2018-178425

(51) Int. Cl.
*G01N 35/10* (2006.01)
*B01L 3/02* (2006.01)

(52) U.S. Cl.
CPC ........ *G01N 35/1016* (2013.01); *B01L 3/0293* (2013.01); *G01N 35/1097* (2013.01);
(Continued)

(58) Field of Classification Search
CPC ........... G01N 35/1016; G01N 35/1097; G01N 2035/1025; G01N 35/04; G01N 2035/0437; B01L 3/0293; B01L 2400/0622
See application file for complete search history.

(56) References Cited

U.S. PATENT DOCUMENTS

2011/0174343 A1* 7/2011 Azuma ............... G01N 35/1004
134/113
2014/0190253 A1* 7/2014 Nishida .................. G01F 23/00
73/304 C
(Continued)

FOREIGN PATENT DOCUMENTS

JP 2004251799 A 9/2004
JP 2010071766 A 4/2010
(Continued)

OTHER PUBLICATIONS

Search Report mailed Nov. 5, 2019 in corresponding International Application No. PCT/JP2019/033908.
(Continued)

*Primary Examiner* — John McGuirk
(74) *Attorney, Agent, or Firm* — Miles & Stockbridge, P.C.

(57) ABSTRACT

Provided is an automatic analyzer in which an abnormality of a flow path including malfunction of an electromagnetic valve or a pressure change portion can be detected using an existing sensor that measures a liquid amount in a container. A syringe 103, a first electromagnetic valve 104, and a second electromagnetic valve 105 are operated such that a predetermined liquid aspirating and discharging operation is performed in a container 101, a liquid discharging unit 108, and flow path systems 113 and 114 and whether or not an
(Continued)

abnormality occurs in the flow path system is determined based on a liquid amount measured by the sensor 102.

6 Claims, 8 Drawing Sheets

(52) U.S. Cl.
CPC ............... *B01L 2400/0622* (2013.01); *G01N 2035/1025* (2013.01)

(56) References Cited

U.S. PATENT DOCUMENTS

| | | |
|---|---|---|
| 2015/0000428 A1 | 1/2015 | Fukuda et al. |
| 2015/0007713 A1 | 1/2015 | Aki |
| 2018/0188278 A1 | 7/2018 | Drews et al. |

FOREIGN PATENT DOCUMENTS

| | | | |
|---|---|---|---|
| JP | 2011033426 A | * | 2/2011 |
| JP | 2013181903 A | | 9/2013 |
| JP | 201425812 A | | 2/2014 |
| JP | 201514990 A | | 1/2015 |
| JP | 2015010894 A | | 1/2015 |

OTHER PUBLICATIONS

Written Opinion mailed Nov. 5, 2019 in corresponding International Application No. PCT/JP2019/033908.

* cited by examiner

AUTOMATIC ANALYZER

TECHNICAL FIELD

The present invention relates to an automatic analyzer.

BACKGROUND ART

In a field of automatic analyzers that perform qualitative and quantitative analysis of biological samples such as blood and urine, in clinical tests that analyze components contained in a biological sample such as blood and urine of a patient, the sample and a reagent react to perform qualitative and quantitative analysis of a target component in the sample. In this case, a liquid supply mechanism called a dispensing mechanism is used to supply a predetermined amount of the sample and the reagent to a reaction container in which the sample and the reagent react. In order to supply the liquid, a pressure in a nozzle that aspirates a liquid using a syringe is set as a negative pressure, the liquid to be aspirated is aspirated into the nozzle, and then a predetermined amount of the liquid is dispensed into the reaction container by setting the pressure in the nozzle to a positive pressure using a syringe.

PTL 1 discloses that a pressure sensor is provided in a pipe connecting a dispensing nozzle and a dispensing syringe, output in the pipe is measured by the pressure sensor, and an abnormality in any of an electromagnetic valve, a gear pump, and a water tank is detected based on the output. Further, PTL 2 discloses that malfunction of an electromagnetic valve is detected by equipping the electromagnetic valve with an operation sensor.

CITATION LIST

Patent Literature

PTL 1: JP-A-2014-25812
PTL 2: JP-A-2015-14990

SUMMARY OF INVENTION

Technical Problem

Addition of a pressure sensor to a device or disposing of a sensor on an electromagnetic valve as in the related art leads to an increase in the cost of the device. Further, the addition of the sensor to a flow path or an electromagnetic valve changes a control circuit or a flow path with respect to the existing device configuration, which limits applicable products and applicable ranges.

Therefore, the invention provides an automatic analyzer that can detect an abnormality related to a flow path system by using a sensor that is originally provided in the automatic analyzer and detects an amount of liquid such as reagents, cleaning reagents, and measurement targets.

Solution to Problem

An automatic analyzer according to an embodiment of the invention includes: a sensor that measures a liquid amount of a container containing liquid; a flow path system; a liquid discharging unit that discharges liquid from the flow path system; a syringe that is connected to a branch portion of the flow path system and changes an internal pressure of a flow path; and a controller, in which the flow path system includes a first flow path, a second flow path, a first electromagnetic valve, and a second electromagnetic valve, the first flow path ranging from a nozzle to the branch portion, the nozzle aspirating or dispensing liquid from or to the container, the second flow path ranging from the branch portion to the liquid discharging unit, the first electromagnetic valve being provided on the first flow path and opening and closing the first flow path, and the second electromagnetic valve being provided on the second flow path and opening and closing the second flow path, and the controller operates the syringe, the first electromagnetic valve, and the second electromagnetic valve such that a predetermined aspirating, dispensing and discharging liquid operation is performed in the container, the liquid discharging unit, and the flow path system and whether or not an abnormality occurs in the flow path system is determined based on the liquid amount measured by the sensor.

Advantageous Effect

According to the invention, it is possible to detect an abnormality in a flow path including malfunction of an electromagnetic valve or a pressure change portion by using an existing sensor that measures a liquid amount in a container without mounting an operation sensor of an electromagnetic valve or a pressure sensor of a flow path system.

Other technical problems and novel characteristics will become apparent from a description of the description and the accompanying drawings.

DESCRIPTION OF EMBODIMENTS

Hereinafter, embodiments of the invention are described with reference to the drawings.

Embodiment 1

Embodiment 1 is an automatic analyzer 100 that detects an abnormality occurring in a flow path system by a sensor that measures a liquid amount.

Figure 1:
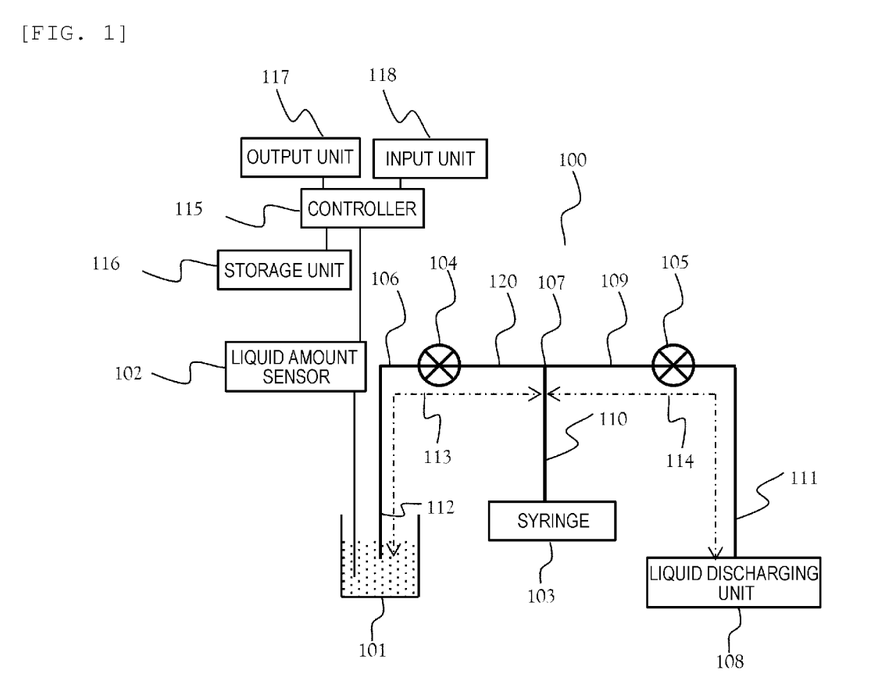
FIG. 1 illustrates a flow path system of an automatic analyzer according to Embodiment 1.

FIG. 1 is a diagram schematically illustrating a flow path system for sending various types of liquid in the automatic analyzer 100. The flow path system of the automatic analyzer 100 includes: a container 101 that contains liquid; a liquid amount sensor 102 that measures a liquid amount in the container 101; a syringe 103 that aspirates or dispenses the liquid by changing a pressure in a flow path; a first electromagnetic valve 104 and a second electromagnetic valve 105 that are normally open (close the flow path when energized); a nozzle 112 that aspirates or dispenses the liquid from the container 101; a flow path 106 that connects the nozzle 112 and the first electromagnetic valve 104; a branch portion 107; a flow path 120 that connects the branch portion 107 and the first electromagnetic valve 104; a flow path 109 that connects the second electromagnetic valve 105 and the branch portion 107; a flow path 110 that connects the branch portion 107 and the syringe 103; and a flow path 111 that connects the second electromagnetic valve 105 and a liquid discharging unit 108. The flow path system of the automatic analyzer 100 can send the liquid in the container 101 to the liquid discharging unit 108.

Here, since the container 101 and the liquid discharging unit 108 have almost the same height, a pressure at a tip end of the nozzle 112 and a pressure at a tip end of the flow path 111 which is connected to the liquid discharging unit 108 become equal, and even if the electromagnetic valves 104, 105 are opened, the liquid does not flow in the flow path system unless an action is applied by the syringe 103. Therefore, in this example, electromagnetic valves that are normally open are used as the first electromagnetic valve 104 and the second electromagnetic valve 105. However, the electromagnetic valve is only required to control whether to stop or allow a flow of a flow path, and depending on a structure of the flow path, the electromagnetic valve may be normally closed (open the flow path when energized), and a structure of the valve is not limited. A pinch valve, a diaphragm valve, a non-diaphragm valve, or the like may be used.

A first flow path 113 refers to a flow path including the nozzle 112, the flow path 106, the first electromagnetic valve 104, and the flow path 120 from the container 101 to the branch portion 107. Further, a second flow path 114 refers to a flow path including the flow path 109, the second electromagnetic valve 105, and the flow path 111 from the liquid discharging unit 108 to the branch portion 107.

A controller 115 controls the first electromagnetic valve 104, the second electromagnetic valve 105, and the syringe 103. The controller 115 also includes an output unit 117 and an input unit 118 that form an interface with a user. For example, the input unit 118 includes a keyboard and a mouse, and the output unit 117 includes a display and a printer. The controller 115 further includes a storage unit 116, and stores, for example, an output result of the liquid amount sensor 102.

The liquid amount sensor 102 only needs to be able to measure a liquid amount in the container 101, a measuring method uses any one of a capacitance type, an electrode type, an optical type, an ultrasonic type, and a float type, and the liquid amount sensor 102 may be a weight sensor. The liquid amount sensor 102 is originally provided for preventing an aspiration amount from being insufficient in case that the liquid contained in the container 101 is insufficient. When the liquid amount sensor 102 detects that the liquid amount in the container 101 is less than a predetermined amount, the controller 115 ends an analysis operation and urges the user to replenish the liquid by giving the output unit 117 an alarm notifying the replenishment of the liquid or the replacement of the container 101.

Further, the liquid discharging unit 108 may be in a form of a container or the like, and instead of providing the liquid amount sensor 102 in the container 101, the liquid amount sensor 102 may be provided in the liquid discharging unit 108.

An operation of sending the liquid in the container to the flow path is called aspiration, an operation of removing unnecessary liquid in the flow path (sending to the liquid discharging unit 108) is called discharge, and an operation of sending the liquid in the flow path to the container is called dispensation.

Figure 2:
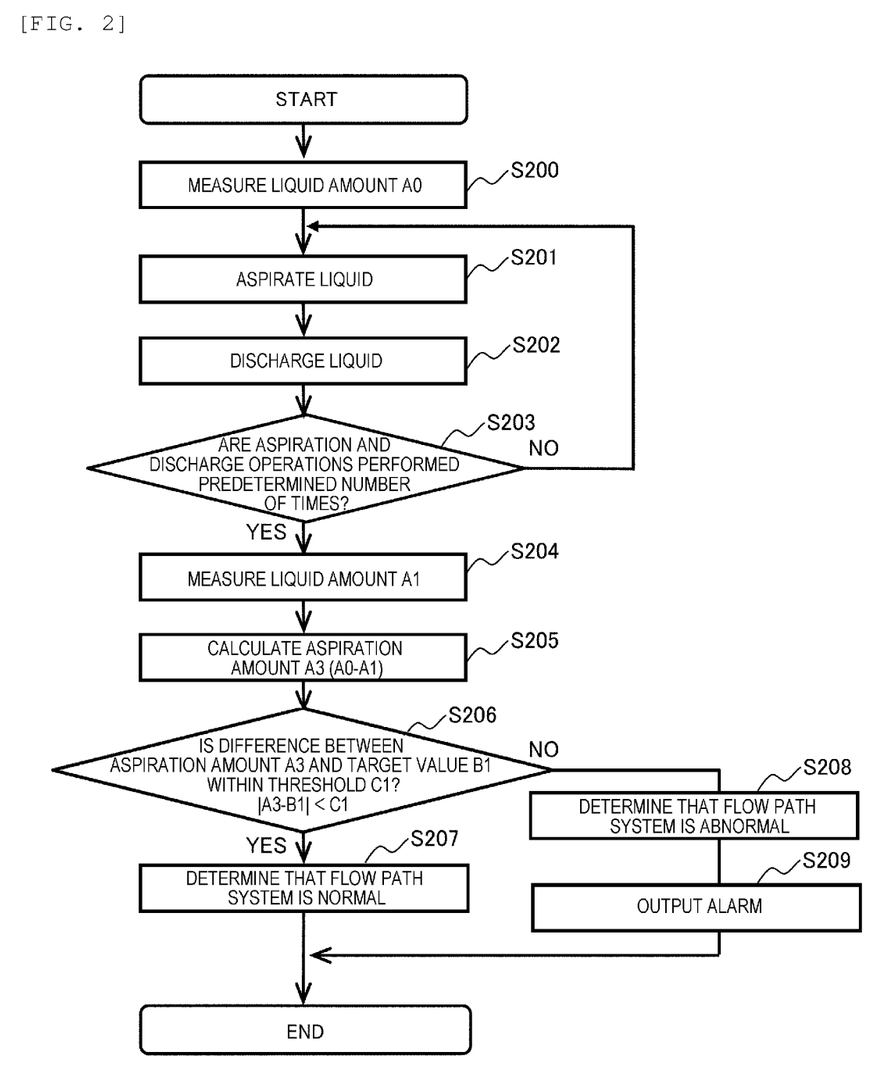
FIG. 2 is a flowchart illustrating a process of detecting an abnormality of the flow path system.

FIG. 2 is an example of a flowchart of detecting an abnormality in the flow path system in the automatic analyzer 100.

First, the controller 115 measures a liquid amount AO in the container 101 by the liquid amount sensor 102 (step S200). Here, information obtained by the liquid amount sensor 102 differs depending on the type of the sensor provided in the container 101. For example, if the sensor is a liquid level detecting sensor, the information is a height of a liquid level, and if the sensor is a weight sensor, the information is a weight of liquid. The controller 115 converts output information of the liquid amount sensor 102 into the liquid amount in the container 101 and stores the output information in the storage unit 116. Further, if the liquid amount in the container 101 is determined in advance, step S200 can be omitted. In this case, the controller 115 may substitute an initial value corresponding to the liquid amount in the container 101 as the liquid amount AO.

Next, the controller 115 aspirates the liquid in the container 101 from the nozzle 112 and fills the first flow path 113 with the liquid by opening the first electromagnetic valve 104, closing the second electromagnetic valve 105, and generating a negative pressure in the flow path using the syringe 103 (step S201).

Next, the liquid is sent into the flow path 110 by further generating a negative pressure in the flow path using the syringe 103. Further, in a state where the second electromagnetic valve 105 is opened and the first electromagnetic valve 104 is closed, a positive pressure is generated in the flow path by the syringe 103. Accordingly, the liquid in the flow path 110 is discharged to the liquid discharging unit 108 via the second flow path 114 (step S202).

Next, the controller 115 determines whether the operations of steps S201 and S202 are performed a predetermined number of times (step S203). If the number of times is less than the predetermined number, the controller 115 repeats the operations of steps S201 and S202. A target value of an aspiration amount of the liquid aspirated from the container 101 assumed by performing the operations of steps S201 and S202 the predetermined number of times is B1.

Next, the controller 115 measures a liquid amount A1 in the container 101 by the liquid amount sensor 102 (step S204). The liquid amount A1 is stored in the storage unit 116. The controller 115 calculates a liquid amount A3 obtained by subtracting the liquid amount A1 from the liquid amount AO (step S205). The liquid amount A3 is an actual amount of the liquid aspirated from the container 101 in step S201. A target liquid amount B1 is subtracted from the actually aspirated liquid amount A3, and the difference is compared with a threshold C1 determined in consideration of a variation of a device and a measurement variation of the liquid amount sensor 102, or the like (step S206). When $|A3-B1|<C1$, the controller 115 determines that the aspiration amount is normal and the flow path system is normal (step S207). On the other hand, when $|A3-B1|\geq C1$, that is, when the actually aspirated liquid amount A3 deviates from the target value B1, the controller 115 determines that an abnormality occurs in the flow path system (step S208), displays an alarm on the output unit 117 (step S209), and ends the abnormality detection of the flow path system.

A method for determining an abnormality in the flow path system in step S206 is not limited to the above. For example, by using predetermined thresholds C2 and C3, when C2<A1<C3, the controller 115 may determine that the flow path system is normal. In this case, when A1<C2 or C3<A1, the controller 115 determines that an abnormality occurs in the flow path system.

Here, the thresholds C1, C2, and C3, which are used by the controller 115 to determine an abnormality in the flow path system in step S206, may be, for example, predetermined fixed values or statistics. For example, when the liquid amount sensor 102 is a liquid level sensor and a liquid level height is used as the liquid amount, it is also possible to set the threshold as 4 times a standard deviation calculated based on a measured value of the liquid level height so far. Further, determination of an abnormality is not limited to a determination method based on a threshold, and may use statistical processing by a Mahalanobis Taguchi (MT) method, a linear determination method, or the like.

As a reason of causing an abnormality in the flow path system of the automatic analyzer 100, opening and closing malfunction of the first electromagnetic valve 104 and the second electromagnetic valve 105, malfunction of the syringe 103, clogging of the nozzle 112 and the liquid discharging unit 108, a liquid leakage in the first flow path 113 and the second flow path 114, or the like may be considered. Regardless of which malfunction occurs, a normal liquid amount of the liquid cannot be sent from the container 101 to the liquid discharging unit 108, and therefore basic functions of the automatic analyzer cannot be guaranteed. Influences of each of the above-described malfunction will be described.

First, the malfunction of the first electromagnetic valve 104 means that a closing operation cannot be performed. Therefore, in step S202, the liquid flows back into the container 101 while the first electromagnetic valve 104 is in an open state. The malfunction of the second electromagnetic valve 105 also means that a closing operation cannot be performed, and thus the liquid is aspirated from the second flow path 114 in step S201 while the second electromagnetic valve 105 is in an open state, and a predetermined amount of the liquid cannot be aspirated from the container 101.

Further, when the syringe 103 malfunctions, the predetermined amount of the liquid cannot be aspirated in step S201. Clogging of the liquid discharging unit 108 generates an excessive pressure in the second flow path 114 in step S202, and when the first electromagnetic valve 104 is opened again in step S201, the liquid flows back into the container 101. Thus, the abnormality in the flow path system is finally reflected in the amount of the liquid aspirated from the container 101. Therefore, it is possible to determine an abnormality in the flow path system regardless of the reason of the abnormality.

When the electromagnetic valves are normally closed, contrary to the electromagnetic valves that are normally open, the flow path cannot be opened if the electromagnetic valves malfunction. Therefore, due to the malfunction of the first electromagnetic valve 104, the aspiration amount becomes insufficient during the aspiration from the container 101. Similarly, since the liquid cannot be discharged due to the malfunction of the second electromagnetic valve 105, a pressure higher than normal is applied to the second flow path 114, and similar to the case of clogging of the liquid discharging unit 108 described above, when the first electromagnetic valve 104 is opened again, the liquid flows back into the container 101. Thus, when the electromagnetic valve is normally closed, the abnormality in the flow path system can also be determined from the flowchart of FIG. 2.

Figure 3:
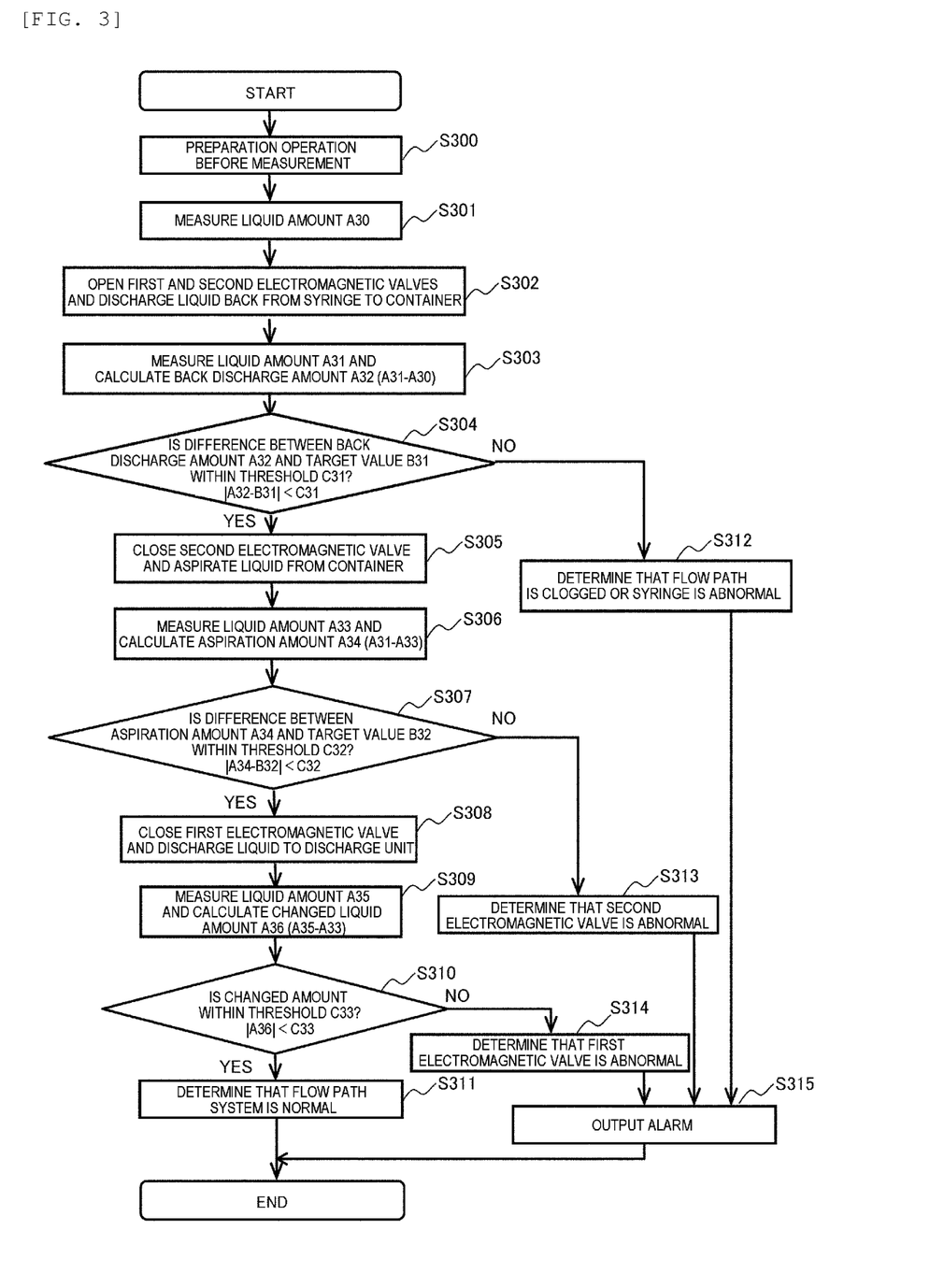
FIG. 3 is a flowchart illustrating a process of specifying an abnormality position of the flow path system.

FIG. 3 illustrates an example of a flowchart of specifying an abnormal position of the flow path system. The processing is performed when it is determined that there is an abnormality in the flow path system in the flowchart of FIG. 2 or when the user checks an operation of a unit related to the flow path system.

First, as a preparation operation, the controller 115 performs steps S201 and S202 of the flowchart of FIG. 2 to fill the first flow path 113 and the second flow path 114 with the liquid (step S300).

Next, in the same manner as in step S200, a liquid amount A30 in the container 101 is measured, and the output information of the liquid amount sensor 102 is stored in the storage unit 116 (step S301).

Next, the controller 115 causes the liquid to flow back into the container 101 and discharges the liquid to the liquid discharging unit 108 by applying a positive pressure to the syringe 103 in a state where the first electromagnetic valve 104 and the second electromagnetic valve 105 are opened (step S302). As described above, the liquid discharging unit 108 and the aspiration nozzle 112 are set to the same height so that the flow of the liquid due to a pressure difference in the atmospheric pressure does not occur.

Next, the controller 115 measures a liquid amount A31 in the container 101 after dispensing in the same manner as in step S200, obtains a backflow liquid amount (dispense amount) A32 by subtracting the liquid amount A30 before backflow, and stores the liquid amount A32 in the storage unit 116 (step S303).

Next, the controller 115 obtains a difference between the liquid amount A32 that actually flows back and a target liquid amount B31 when backflow occurs in a normal state, and compares the difference with a threshold C31 determined in consideration of the variation of the device, the measurement variation of the liquid amount sensor 102, or the like (step S304). when |A32−B31|≥C31 (when there is a deviation between the target value and a measured value), the controller 115 determines that a dispense amount is insufficient due to an insufficient pressure caused by malfunction other than the electromagnetic valve, that is, malfunction of the syringe 103, and the first flow path 113 or the second flow path 114 is clogged or leaks (step S312), displays an alarm on the output unit 117, and then ends the measurement (step S315). Further, when |A32−B31|<C31, the controller 115 determines that the dispensation is normal, and subsequently performs abnormality determination of the electromagnetic valve.

The controller 115 closes the second electromagnetic valve 105 and aspirates the liquid from the container 101 by the syringe 103 in the same manner as in step S201 of the flowchart of FIG. 2 (step S305). Next, the controller 115 measures a liquid amount A33 in the container 101 after aspiration in the same manner as in step S200, obtains an aspirated liquid amount A34 by subtracting the liquid amount A33 from the liquid amount A31 before aspiration, and stores the liquid amount A34 in the storage unit 116 (step S306).

Next, in the same manner as in step S206 of the flowchart of FIG. 2, the controller 115 obtains a difference between a target liquid amount B32 when aspirated in a normal state and the actually aspirated liquid amount A34, and compares the difference with a threshold C32 (step S307). When |A34−B32|≥C32 (when there is a deviation between the target value and the measured value), the controller 115 determines that the second electromagnetic valve 105 malfunctions (step S313), displays an alarm on the output unit 117, and then ends the measurement (step S315). This is because when the normally open second electromagnetic valve 105 malfunctions, the second electromagnetic valve 105 is always in an open state, and the syringe 103 unintentionally aspirates the liquid in the second flow path 114. On the other hand, when |A34−B32|<C32, the controller 115 determines that the second electromagnetic valve 105 is normal, and subsequently performs abnormality determination of the first electromagnetic valve 104.

The controller 115 closes the first electromagnetic valve 104 and discharges the liquid to the liquid discharging unit 108 by the syringe 103 in the same manner as in step S202 of the flowchart of FIG. 2 (step S308). Next, the controller 115 measures a liquid amount A35 in the container 101 after discharge in the same manner as in step S200, obtains a changed liquid amount A36 by subtracting the liquid amount A33 before discharge, and stores the liquid amount A36 in the storage unit 116 (step S309). If the first electromagnetic valve 104 is closed as normal, the liquid amount in the container 101 does not change before and after discharge, so that the changed liquid amount A36 becomes almost 0.

Therefore, the controller 115 compares a threshold C33 determined in consideration of various variations with the changed liquid amount A36 (step S310). When |A36|≥C33, it is considered that the container 101 is unintentionally dispensed, therefore, the controller 115 determines that the first electromagnetic valve 104 malfunctions (step S314), displays an alarm on the output unit 117, and then ends the measurement (step S315). Further, when |A36|<C33, the controller 115 determines that the flow path system is normal and ends the operation (step S311).

Further, the controller 115 may count the number of times i of operations of steps S300 to S311 and repeat the operations of steps S300 to S311 the number of times n which is specified in advance. Repeated inspection can improve the detection accuracy of the malfunction of the electromagnetic valve.

Further, in each abnormality determination, thresholds may be classified in more detail, and processing may be added to determine a liquid leakage if a changed amount is small or malfunction of the electromagnetic valve if a changed amount is relatively large. Further, a step may be added to measure a liquid amount change in the container 101 and determine a liquid leakage in a state where the first electromagnetic valve 104 and the second electromagnetic valve 105 are opened and the syringe 103 is stationary.

By specifying a reason of an abnormality including the malfunction of the electromagnetic valve, quick repair is possible, a period in which the device is unusable by a customer can be shortened, and an influence of malfunction on clinical laboratory work can be minimized.

Embodiment 2

Figure 4:
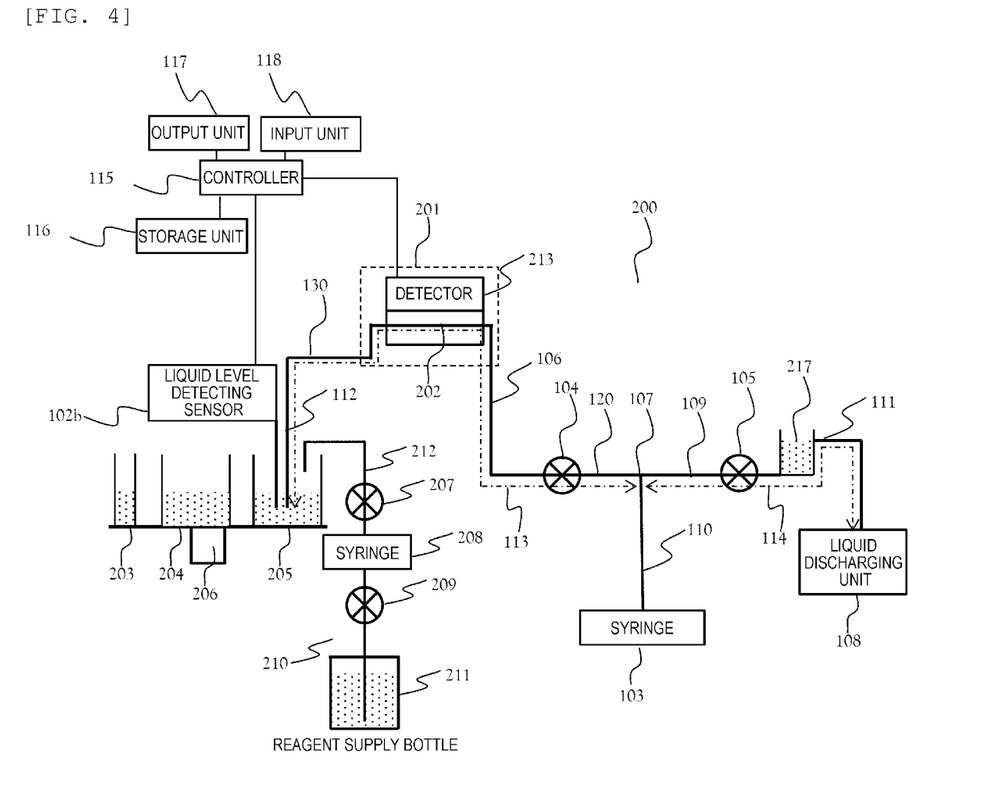
FIG. 4 illustrates a flow path system of an automatic immunoassay analyzer according to Embodiment 2.

Embodiment 2 is an automatic analyzer 200 using an immunoassay method, which detects an abnormality occurring in a flow path system by a sensor for measuring a liquid amount. In the figure, the same members as those described in Embodiment 1 are designated by the same reference numerals and the description thereof will be omitted.

FIG. 4 extracts and illustrates a detecting unit on which the immunoas say method is performed and a configuration related thereto from the automatic immunoassay analyzer 200. The automatic immunoassay analyzer 200 measures a biological sample (hereinafter referred to as a sample) such as blood or urine derived from a patient.

A flow cell detecting unit 201 includes: a flow path 202 through which a reaction solution aspirated by the nozzle 112 and a light-emitting auxiliary reagent or a cleaning reagent that assists detection flow; and a detector 213 that detects light emission of a measurement target substance. In a reaction container 203, the measurement target substance forms a composite modified with magnetic particles and a light-emitting substance by using a reaction between an antigen and an antibody. The detector 213 includes a magnetic particle holding unit (not illustrated), and the magnetic particle holding unit holds and adsorbs the composite that has reached the detector 213 on the flow cell detecting unit 201. Then, the reaction solution which is a solvent of the composite is removed, the light-emitting substance bound to the composite is induced by the light-emitting auxiliary reagent, and a light-emitting amount thereof is detected by the detector 213. The controller 115 calculates a concentration of the measurement target substance based on a result detected by the detector 213, and the calculated concentration of the measurement target substance is output from the output unit 117. This series of steps performed by the flow cell detecting unit 201 is called the immunoassay method.

The automatic analyzer 200 includes a container exchange mechanism 206 capable of moving the reaction container 203, a light-emitting auxiliary reagent container 204, and a cleaning reagent container 205 in an up and down direction and a left and right direction by a pulse motor. A rotation amount of the pulse motor is determined by a commanded number of pulses, and a rotation amount of the motor is proportional to a moving distance of a container, so that accurate positioning is possible. The nozzle 112 can aspirate liquid in the container disposed by the container exchange mechanism 206 without moving.

The first flow path 113 refers to a flow path including the nozzle 112, a flow path 130 connecting the nozzle 112 and the flow path 202, the flow path 202, the flow path 106 connecting the flow path 202 and the first electromagnetic valve 104, the first electromagnetic valve 104, and the flow path 120 from the container 205 or the like to the branch portion 107. Further, the second flow path 114 refers to a flow path including the flow path 109, the second electromagnetic valve 105, an atmospheric pressure opening unit 217, and the flow path 111 from the liquid discharging unit 108 to the branch portion 107. Since the second flow path 114 includes the atmospheric pressure opening unit 217, and a hydrostatic pressure acting on the nozzle 112 and the atmospheric pressure opening 217 becomes constant, the liquid can be held in the flow path even when the first electromagnetic valve 104 and the second electromagnetic valve 105 are opened.

In the cleaning reagent container 205, a cleaning reagent is appropriately supplied from a reagent supply bottle 211 to the cleaning reagent container 205 by a dispensing machine 210 including a flow path 212, an electromagnetic valve 207, a syringe 208, and an electromagnetic valve 209. Although not illustrated, the reagent is supplied to the light-emitting auxiliary reagent container 204 with the same configuration. In Embodiment 2, the first electromagnetic valve 104 and the second electromagnetic valve 105 are pinch valves that are normally open (close the flow path when energized), and the electromagnetic valves 207, 209 are solenoid valves that are normally closed.

Figure 5:
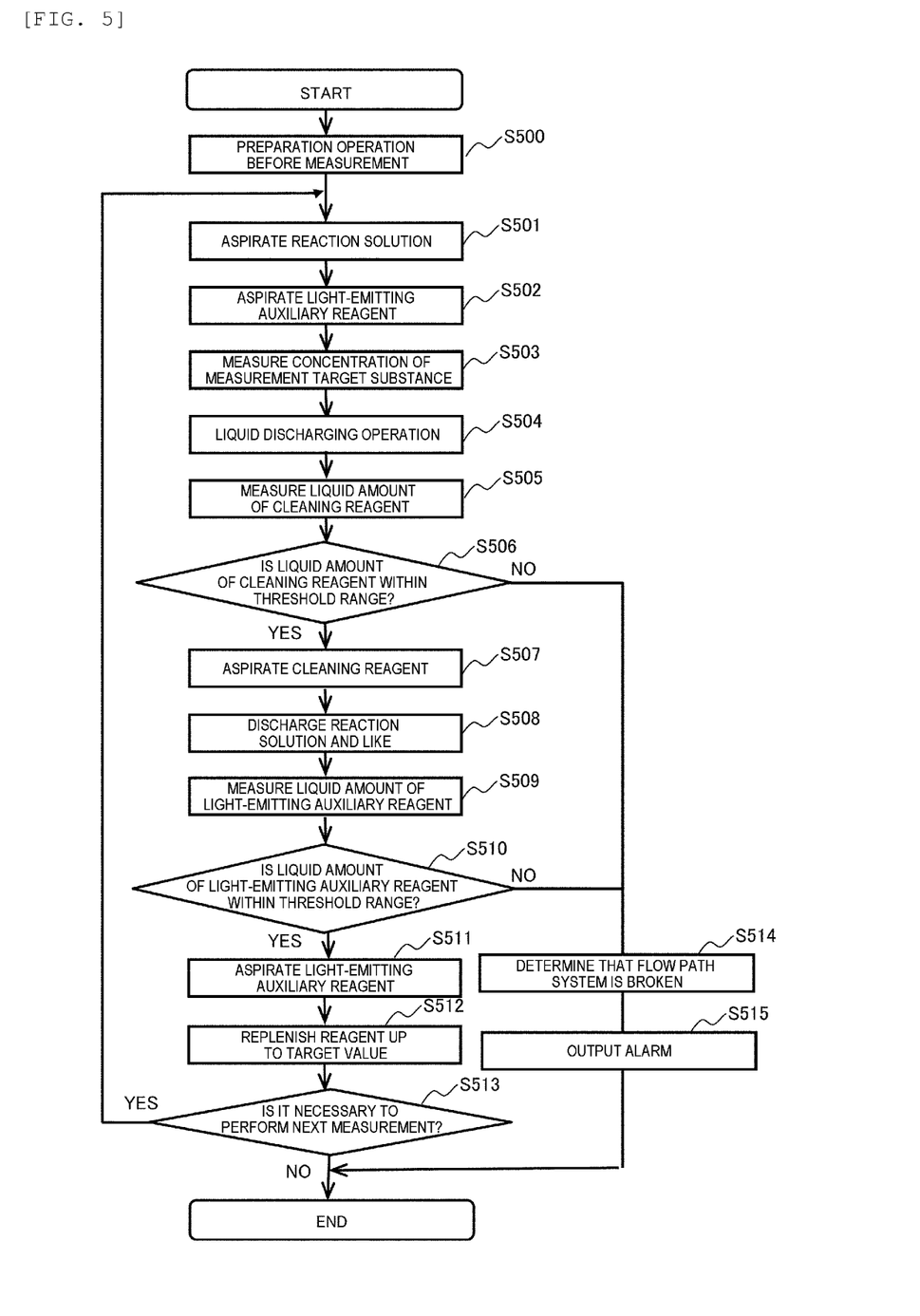
FIG. 5 is a flowchart illustrating a process of detecting an abnormality of the flow path system.

FIG. 5 is an example of a flowchart of detecting an abnormality in the flow path system in the automatic analyzer 200.

As a preparation operation before the start of measurement, the controller 115 dispenses the light-emitting auxiliary reagent into the light-emitting auxiliary reagent container 204 by the dispensing machine 210, and dispenses the cleaning reagent into the cleaning reagent container 205 with a liquid amount required for the next measurement (step S500).

First, the container exchange mechanism 206 inserts the nozzle 112 into the reaction container 203 by rotating and moving the reaction container 203 up and down. Next, the reaction solution in the reaction container 203 is aspirated from the nozzle 112 by opening the first electromagnetic valve 104, closing the second electromagnetic valve 105, and generating a negative pressure in the first flow path 113 by the syringe 103 (step S501). The measurement target object is held in the flow path 202 of the detecting unit 201 by adsorbing and holding the magnetic particles of the composite using the magnetic particle holding unit (not illustrated).

Next, the light-emitting auxiliary reagent container 204 is disposed at a position where the nozzle 112 can aspirate the light-emitting auxiliary reagent, by the container exchange mechanism 206, and the light-emitting auxiliary reagent in the light-emitting auxiliary reagent container 204 is aspirated (step S502). Accordingly, the light-emitting auxiliary reagent is aspirated into the flow path 202.

Next, in the detecting unit 201, an unreacted component of the reaction solution is removed and replaced with the light-emitting auxiliary reagent to induce a light-emitting reaction of a light-emitting label in the composite of the measurement target object, and the measurement target object is detected and qualitative and quantitative analysis is performed by detecting the light emission (step S503). The flow cell detecting unit 201 disperses the composite, in which the magnetic particles are adsorbed and held, in the light-emitting auxiliary reagent by opening the magnetic particle holding unit. The first electromagnetic valve 104 is closed, the second electromagnetic valve 105 is opened, and the syringe 103 is operated for dispensing. The above operations are to return a plunger of the syringe to a home position and enable the aspirating operation again. Accordingly, a part of the reaction solution and the light-emitting auxiliary reagent used for the measurement is discharged into the liquid discharging unit 108 (step S504).

Next, the container exchange mechanism 206 moves the cleaning reagent container 205 under the nozzle 112 and then raises the cleaning reagent container 205 towards the nozzle 112. When a liquid level of the cleaning reagent container 205 is detected by a liquid level detecting sensor 102b, which is disposed parallel to the nozzle 112 and whose tip end is disposed at the same height as the tip end of the nozzle 112, the rise is stopped. The controller 115 calculates a liquid amount in the container 205 based on the number of remaining pulses (hereinafter, remaining pulses) up to a position of an upper limit of movement of a pulse motor that has detected the liquid level, and stores the liquid amount in the storage unit 116. A physical amount to be stored may be remaining pulses or moving pulses, and may be a value that can grasp the liquid amount (step S505).

The controller 115 determines a state of the flow path system based on the liquid amount in the cleaning reagent container 205 (step S506), determines that malfunction occurs in the flow path system when a difference is out of a threshold range determined in consideration of a variation of a device and a measurement variation (step S514), displays an alarm on the output unit 117, and then ends the measurement (step S515). Details of a method for determining malfunction of the flow path system will be described later.

Next, the controller 115 causes the syringe 103 to perform an aspirating operation in a state where the first electromagnetic valve 104 is opened and the second electromagnetic valve 105 is closed (step S507). At this time, by raising the cleaning reagent container 205 by the container exchange mechanism 206, a state where the tip end of the nozzle 112 is always immersed under a liquid level is maintained, and aspiration of air bubbles is prevented. Next, the first electromagnetic valve 104 is closed, the second electromagnetic valve 105 is opened, and the syringe 103 is operated for dispensing (a positive pressure is generated in the flow path). Accordingly, the reaction solution, the light-emitting auxiliary reagent, and the cleaning reagent used for the measurement are discharged into the liquid discharging unit 108 (step S508).

Next, the liquid level detecting sensor 102b measures a liquid level of the light-emitting auxiliary reagent container 204 and stores a result in the storage unit 116 in the same manner as in step S505. The controller 115 determines a state of the flow path system based on a liquid amount in the light-emitting auxiliary reagent container 204 (step S510), determines that malfunction occurs in the flow path system when the difference is out of the threshold range determined in consideration of the variation of the device and the measurement variation (step S514), displays an alarm on the output unit 117, and then ends the measurement (step S515). Details of a method for determining malfunction of the flow path system will be described later.

Next, the light-emitting auxiliary reagent is aspirated in the same manner as in step S502, and the light-emitting auxiliary reagent fills the flow path 202 of the detecting unit 201 (step S511). This is because an electrochemical condition of the flow path 202 of the detecting unit 201 is stabilized by pre-filling the detecting unit 201 with the light-emitting auxiliary reagent in preparation for the next measurement.

Next, the controller 115 dispenses the light-emitting auxiliary reagent or the cleaning reagent to each container up to a target value by the dispensing machine 210 based on the liquid amounts in the light-emitting auxiliary reagent container 204 and the cleaning reagent container 205 stored in the storage unit 116 (step S512).

Then, steps S501 to S512 are repeated until a predetermined number of analyzes are ended (step S513).

Figure 6:
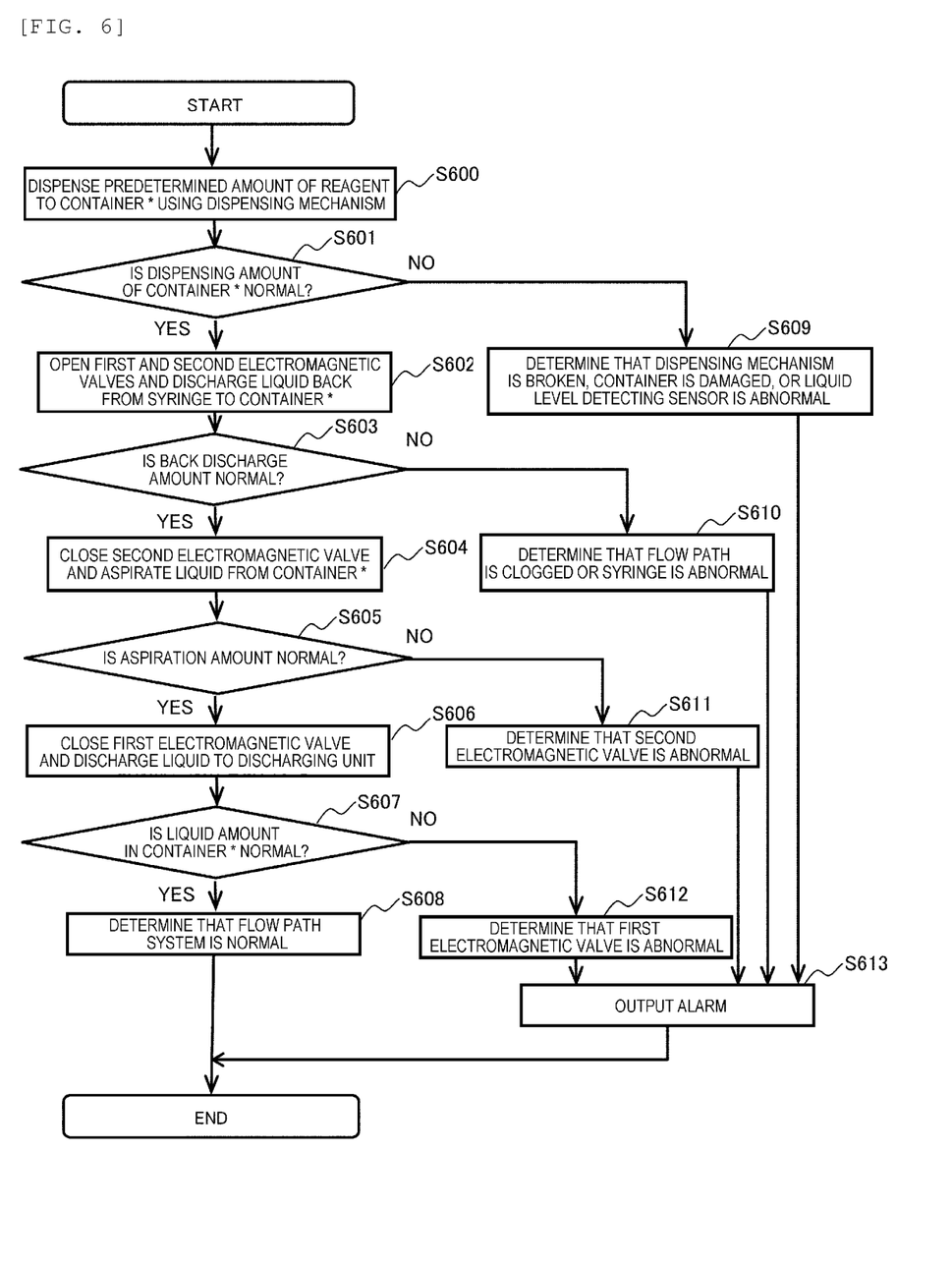
FIG. 6 is a flowchart illustrating a process of specifying an abnormality position of the flow path system.

In this flowchart, liquid level detection is performed for the liquid aspirating operation in steps 507 and 511, and the liquid amount in the container is detected by using the liquid level detection (steps S505 and S509). Therefore, in one measurement cycle (steps S501 to S512), liquid amounts are measured once for each of the cleaning reagent and the light-emitting auxiliary reagent, so that malfunction of the flow path system is determined by comparing with a measurement result in the previous measurement cycle. By not adding a new step only for detecting the liquid amount in the container, it is not necessary to redefine a sequence of the automatic analyzer, and it is possible to prevent a time required for one cycle from being extended. On the other hand, since malfunction of the flow path system can be detected in the next measurement cycle when the malfunction of the flow path system occurs in the current measurement cycle, the controller 115 gives an alarm retroactively to the measurement result one cycle before. Further, it is recommended to a user to perform a maintenance operation (flowchart in FIG. 6) for specifying a malfunction position, which will be described later. The system may be configured such that the maintenance operation illustrated in FIG. 6 is automatically performed after the alarm is output.

The method for determining an abnormality in the flow path system in steps S506 and S510 will be described. When malfunction occurs in the flow path system, the liquid amount in the container changes as follows. When the first electromagnetic valve 104 malfunctions and is in an always-open state, the liquid flows back into the first flow path 113 in the operations (steps S504 and S508) of the syringe 103 discharging the liquid into the liquid discharging unit 108. Accordingly, the liquid amounts in the light-emitting auxiliary reagent container 204 and the cleaning reagent container 205 increase from a normal state. Further, when the second electromagnetic valve 105 malfunctions, the liquid contained in the second flow path 114 is unintentionally aspirated in the operations (steps S505 and S509) of aspirating the light-emitting auxiliary reagent and the cleaning reagent. Accordingly, since a specified amount of the liquid cannot be aspirated from the first flow path 113, aspiration is insufficient in the liquid amounts in the light-emitting auxiliary reagent container 204 and the cleaning reagent container 205 as compared with the normal state. Further, when a pressure in the flow path is lowered due to malfunction such as a liquid leakage of the syringe 103 or when the flow path 113 is clogged or leaks, the aspiration of the nozzle 112 is insufficient, so that the aspiration in the liquid amounts in the light-emitting auxiliary reagent container 204 and the cleaning reagent container 205 is insufficient as compared with the normal state. Therefore, it is possible to determine malfunction of the flow path system by detecting such insufficient aspiration.

A statistic used for determining an abnormality in the flow path system may be a value related to the liquid amount, and may be the remaining pulses or the liquid amount calculated based on the remaining pulses, or a height of the liquid level or a weight of the liquid depending on a type of the sensor. Further, as a method for determining an abnormality in the flow path system, not only a determination method of using a predetermined fixed range (threshold), but also a method of determining a difference between a measured value and a previous measured value or a difference between a target value and an actually measured value using a threshold, and a method of performing statistical processing by comparing with the past numerical values stored in a storage unit can be adopted. For example, the threshold may be a variable threshold obtained by adding 4 times an average value and a standard deviation calculated based on the measured values of the liquid level height so far.

In this flowchart, an abnormality in the flow path system is detected by using both the cleaning reagent and the light-emitting auxiliary reagent. This is because the detection accuracy can be improved by increasing the number of detections. The detection may be performed by using only one of the cleaning reagent and the light-emitting auxiliary reagent.

FIG. 6 illustrates an example of a flowchart of specifying an abnormal position of the flow path system. The above processing may be performed when it is determined that there is an abnormality in the flow path system in the flowchart of FIG. 5 or before and after the start of the analysis operation.

First, the controller 115 dispenses a predetermined amount of the cleaning reagent into the empty cleaning reagent container 205 by the dispensing machine 210 (step S600). Here, the cleaning reagent container 205 will be described as an example, but the light-emitting auxiliary reagent container 204 and other containers that can contains liquid may be used. Therefore, in FIG. 6, these containers are referred to as "container *". Next, the liquid level detecting sensor 102*b* measures a liquid level of the cleaning reagent container 205. The controller 115 determines whether the liquid level of the cleaning reagent container 205, that is, the dispensing amount is normal (step S601). If the dispensing amount is equal to or less than the threshold, it is determined that the dispensing machine 210 malfunctions, the cleaning reagent container 205 is damaged, or the liquid level detecting sensor 102*b* is abnormal (step S609), and an alarm is displayed on the output unit 117 to end the measurement (step S613). Since the electromagnetic valves 207, 209 of the dispensing machine 210 are solenoid valves that are normally closed, the electromagnetic valves 207, 209 do not open during malfunction. Therefore, when the electromagnetic valve 207 and the electromagnetic valve 209 malfunction, a normal amount cannot be aspirated from the reagent supply bottle 211, so that the liquid amount in the cleaning reagent container 205 becomes insufficient. Further, the liquid amount becomes insufficient due to damage to the cleaning reagent container 205, clogging and liquid leakage of the flow path 212 of the dispensing machine 210, or malfunction of the syringe 208.

A change in the liquid amount that can be detected by the liquid level detecting sensor 102*b* depends on a time resolution of the liquid level detection. In order to detect a small change in the liquid amount such as liquid leakage, it is necessary to increase the time resolution of the liquid level detection. Normally, a sampling interval of a liquid level detecting sensor is about 3 msec, and in order to narrow the sampling interval, it is necessary to change a control board of the sensor. However, it is possible to increase the time resolution of the liquid level detection without changing the sampling interval of the liquid level detecting sensor. That is, a fact is used that a resolution for detecting a change in a liquid amount in a container by the liquid level detecting sensor, that is, a determinable liquid amount is determined according to a sampling cycle of the liquid level detecting sensor 102*b* and a plunge speed of the liquid level detecting sensor 102*b* into the liquid level of the container. Specifically, if an aspiration nozzle is moved at a speed of about 180 mm/sec during a normal analysis operation (the flowchart in FIG. 5), during the maintenance operation (the flowchart in FIG. 6), a moving speed of the aspiration nozzle is reduced to about 18 mm/sec. Accordingly, a liquid level detecting resolution of the liquid level detecting sensor 102*b* is improved 10 times, a change in the liquid amount of 10 µl can be determined, and even a small amount of liquid leakage can be detected.

Since the processing after step S602 in FIG. 6 is the same as the processing after step S302 in the flowchart of FIG. 3, detailed description thereof will be omitted.

Embodiment 3

Embodiment 3 is an automatic analyzer 300 (FIG. 7) that measures an electrolytic concentration and detects an abnormality occurring in a flow path system by a sensor for measuring a liquid amount. In the figure, the same members as those described in Embodiment 1 or Embodiment 2 are designated by the same reference numerals and the description thereof will be omitted.

Figure 7:
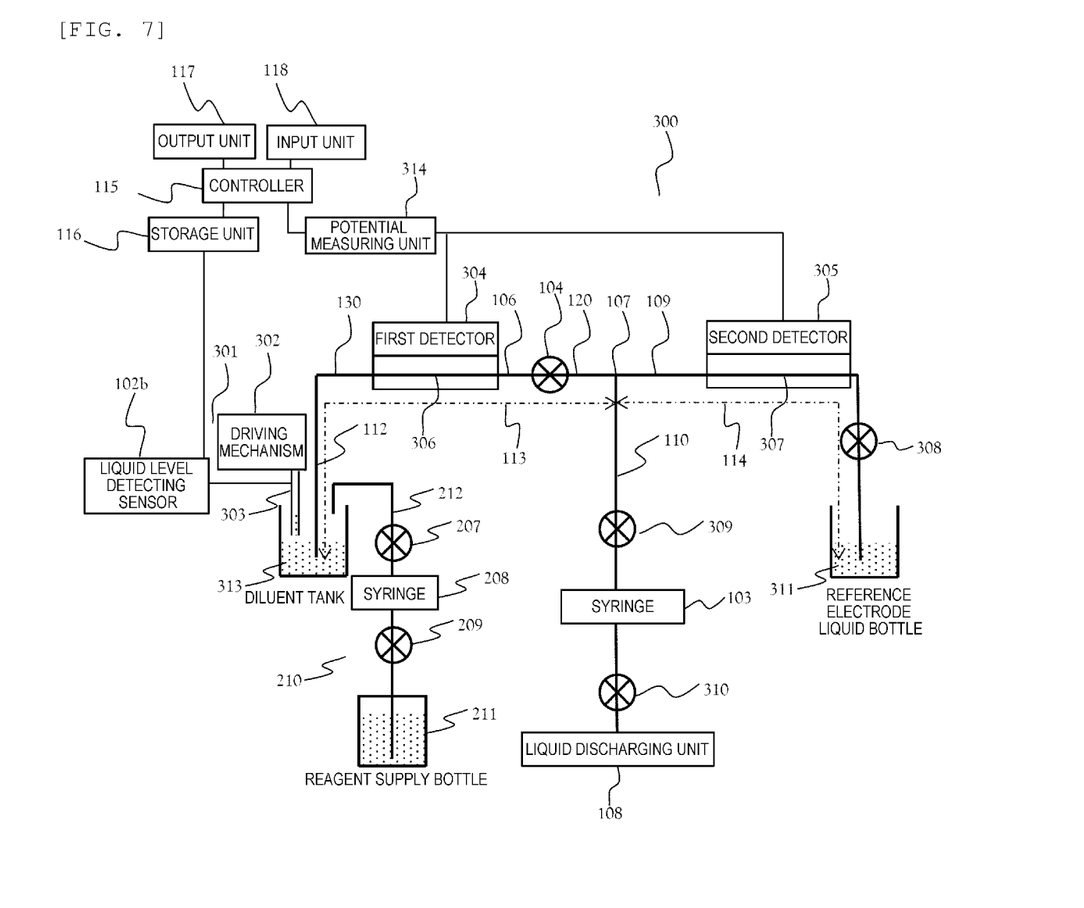
FIG. 7 illustrates a flow path system of a flow type electrolytic concentration measuring device according to Embodiment 3.

In the flow type electrolyte concentration measuring device 300, 15 µl of a sample in a test tube (not illustrated) is separated by a dispensing nozzle 303 of a dispensing unit 301 and discharged to a diluent tank 313. The dispensing unit 301 has a drive mechanism 302, a nozzle 303, and the liquid level detecting sensor 102*b*. The liquid level detecting sensor 102*b* is a capacitance type sensor using a fact that the dispensing nozzle 303 is charged with an electric charge and a capacitance changes when the nozzle 303 adheres to a liquid surface. For blood used for measurement by an automatic analyzer, in order to aspirate serum, that is, a supernatant layer of the sample by the dispensing nozzle 303, the dispensing nozzle 303 needs a capacitance type sensor that detects the liquid level.

The automatic analyzer 300 includes a first detector 304 and a second detector 305. The first detector 304 is an ion-selective electrode unit that includes three types of electrodes, that is, a chlorine ion electrode, a potassium ion electrode, and a sodium ion electrode, and is provided inside a flow path 306. The second detector 305 is a reference electrode, and is provided inside a flow path 307. By appropriately operating the syringe 103 and a second electromagnetic valve 308, a third electromagnetic valve 309, and a fourth electromagnetic valve 310 which are normally closed, reference electrode liquid in a reference electrode liquid bottle 311 is introduced into the flow path 307 of the second detector 305. The dispensing machine 210 replenishes the diluent tank 313 with internal standard solution or diluent from the reagent supply bottle 211. Since a potential difference (electromotive force) between each ion-selective electrode of the first detector 304 and the reference electrode of the second detector 305 changes depending on a concentration of an ion to be analyzed in liquid introduced into each flow path, the electromotive force is measured by a potential measuring unit 314, an ion concentration is calculated by the controller 115, and is output to the output unit 117.

The first electromagnetic valve 104 is a normally open pinch valve, and the second electromagnetic valve 308, the third electromagnetic valve 309, and the fourth electromagnetic valve 310 are normally closed electromagnetic valves. All of the electromagnetic valves can switch and open and close a flow path, and operate appropriately according to a direction and a timing of introducing liquid.

In the present embodiment, the liquid level detecting sensor 102b of the dispensing nozzle 303 that measures a liquid level of the sample is used so as to measure a liquid level of the diluent tank 313, thereby detecting a defect related to the flow path system. Therefore, it is possible to implement a function of detecting an abnormality in the flow path system without requiring an additional device. As long as the liquid level of the diluent tank 313 can be measured, the type of the sensor is not limited, and the liquid level detecting sensor of the dispensing nozzle 303 may be an electrode type sensor. Instead of using the liquid level detecting sensor 102b of the dispensing nozzle 303, the diluent tank 313 may be provided with an optical type, ultrasonic type, or float type liquid amount sensor for measuring the liquid level. Further, a weight sensor may be attached to the diluent tank in order to measure a liquid amount in the diluent tank 313.

Figure 8:
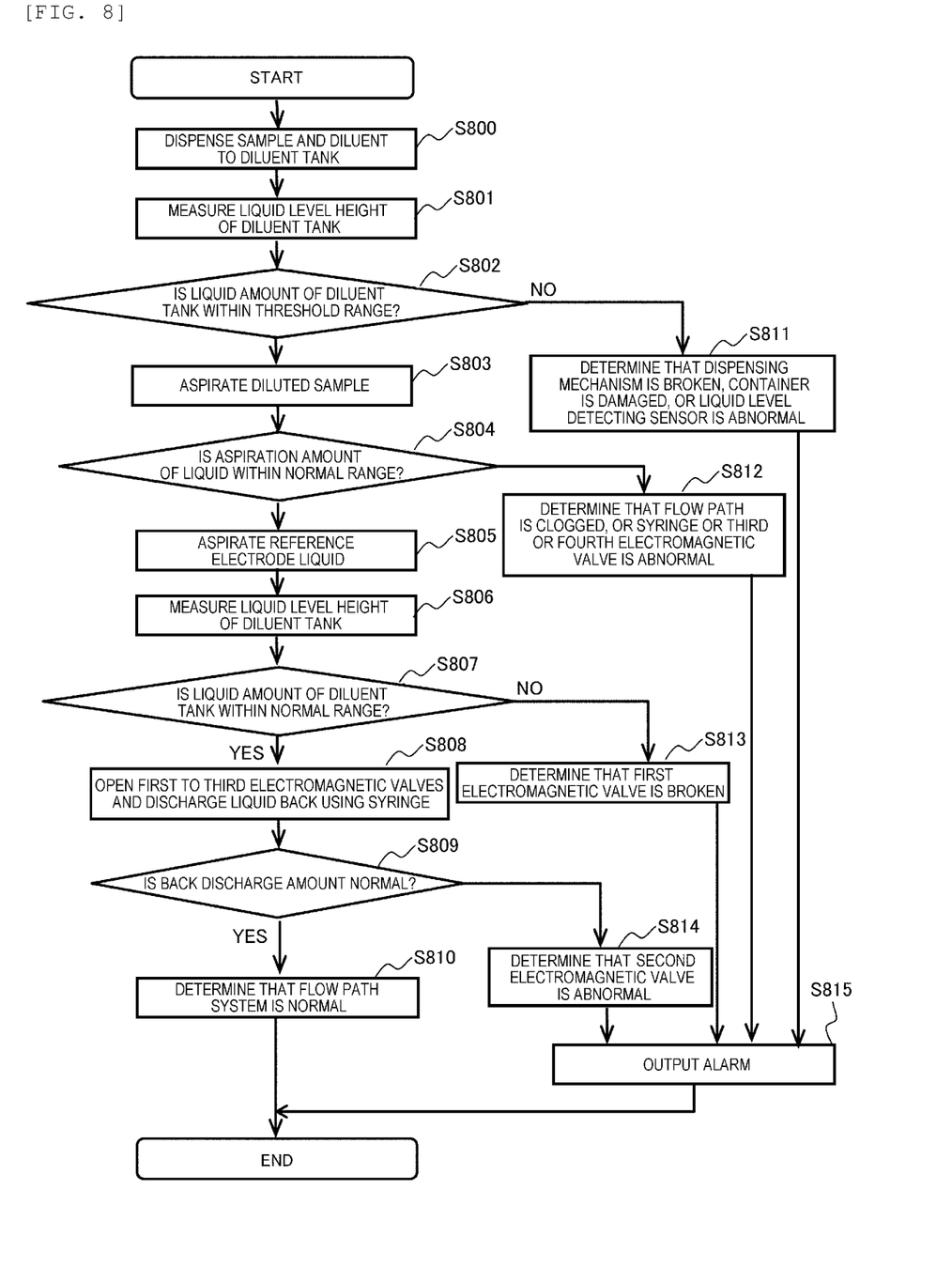
FIG. 8 is a flowchart illustrating a process of detecting an abnormality of the flow path system.

FIG. 8 illustrates an example of a flowchart of detecting an abnormality in the flow path system. The above operation is different from an electrolyte concentration measuring operation usually performed by the flow type electrolytic concentration measuring device 300.

First, as a preparation operation, predetermined amounts of the sample and the diluent are dispensed into the diluent tank 313 by the dispensing machine 210 (step S800). Next, the liquid amount in the diluent tank 313 is measured by the liquid level detecting sensor 102b of the dispensing nozzle 303 (step S801). The controller 115 determines whether the liquid level of the diluent tank 313, that is, the dispensing amount is normal (step S801). The method of determining whether the dispensing amount is normal is the same as in step S601 in the flowchart of FIG. 6. When the liquid amount in the diluent tank 313 is small, damage to the diluent tank 313, malfunction of the syringe 208, the electromagnetic valve 207, and the electromagnetic valve 209 of the dispensing machine 210, malfunction of the liquid level detecting sensor 102b, or the like is considered (step S811). In a case of malfunction, an alarm is output and the measurement is ended (step S815).

Next, the first electromagnetic valve 104 and the third electromagnetic valve 309 are opened, and the second electromagnetic valve 308 and the fourth electromagnetic valve 310 are closed. Next, the syringe 103 applies a negative pressure to the flow path to aspirate the diluted sample from the diluent tank 313 into the flow path 306 of the first detector 304. After that, the third electromagnetic valve 309 is closed and the fourth electromagnetic valve 310 is opened, and the syringe 103 is operated for dispensing. The above operations are to return a plunger of the syringe to a home position and enable the aspirating operation again (step S803).

Here, the controller 115 measures a liquid amount after aspiration by the liquid level detecting sensor 102b of the dispensing nozzle 303. A determination method of an aspiration amount in step S804 uses the same method as in step S307 in the flowchart of FIG. 3. When the liquid amount aspirated here is small, it is determined that the syringe 103 malfunctions, the third electromagnetic valve 309 and the fourth electromagnetic valve 310 malfunction, the flow path 113 leaks or is clogged, or the like (step S812). In the case of malfunction, an alarm is output and the measurement is ended (step S815).

Next, the second electromagnetic valve 308 and the third electromagnetic valve 309 are opened, and the first electromagnetic valve 104 and the fourth electromagnetic valve 310 are closed. Next, the syringe 103 applies a negative pressure to the flow path to introduce the reference electrode liquid from the inside of the reference electrode liquid bottle 311 into the flow path 307 of the second detector 305 (step S805).

Here, the controller 115 measures a change amount of the diluent by the liquid level detecting sensor 102b of the dispensing nozzle 303 (step S806). A determination method of the change amount in step S807 uses the same method as in step S310 in the flowchart of FIG. 3. Here, when the liquid amount changes, it is considered that the first electromagnetic valve 104 malfunctions (step S813).

Next, backflow is generated in the reference electrode liquid bottle 311 and the diluent tank 313 by opening the first electromagnetic valve 104, the second electromagnetic valve 308, and the third electromagnetic valve 309, closing the fourth electromagnetic valve 310, and applying a positive pressure to the flow path by the syringe 103 (step S808).

Next, the liquid amount in the diluent tank 313 after dispensation is measured by the liquid level detecting sensor 102b of the dispensing nozzle 303. A determination method of the dispensation in step S809 uses the same method as in step S304 in the flowchart of FIG. 3 (step S809). Here, when the liquid amount increases, it is considered that the second electromagnetic valve 308 malfunctions. When the above steps are completed normally, it is determined that the flow path system is normal, and the measurement is ended (step S810).

Also in the present embodiment, as in the flowchart of FIG. 2 according to Embodiment 1, an operation for determining malfunction may be added to the flowchart during analysis processing.

The invention is not limited to the above-descried embodiments, and includes various modifications. For example, the above-descried embodiments are described in detail for easy understanding of the invention, and the invention is not necessarily limited to those including all the configurations described above. Further, a part of the configuration of one embodiment can be replaced with the configuration of another embodiment, and the configuration of another embodiment can be added to the configuration of one embodiment. A part of the configuration of each embodiment may be added, deleted, or replaced with another configuration.

REFERENCE SIGN LIST 100, 200: automatic analyzer
101: container
102: liquid amount sensor
102b: liquid level detecting sensor
103, 208: syringe
104, 105, 207, 209, 308, 309, 310: electromagnetic valve
106, 109, 110, 111, 120, 202, 212, 306, 307: flow path
107: branch portion
108: liquid discharging unit
112: nozzle
113: first flow path
114: second flow path
115: controller
116: storage unit
117: output unit
118: input unit
201: flow cell detecting unit
203: reaction container
204: light-emitting auxiliary reagent container
205: cleaning reagent container
206: container replacing mechanism
210: dispensing machine
211: reagent supply bottle
213: detector
217: atmospheric pressure opening portion
300: flow type electrolytic concentration measuring device
301: dispensing unit
302: driving mechanism
303: dispensing nozzle
304: first detector
305: second detector
311: reference electrode liquid bottle
313: diluent tank
314: potential measuring unit

The invention claimed is:

1. An automatic analyzer comprising:
a liquid sensor that measures a liquid amount of a container containing liquid;
a flow path system;
a liquid discharging unit that discharges liquid from the flow path system;
a syringe that is connected to a branch portion of the flow path system and changes an internal pressure of the flow path system; and
a controller, wherein
the flow path system includes a first flow path, a second flow path, a first electromagnetic valve, and a second electromagnetic valve, the first flow path ranging from a nozzle to the branch portion, the nozzle aspirating or dispensing liquid from or to the container, the second flow path ranging from the branch portion to the liquid discharging unit, the first electromagnetic valve being provided on the first flow path and opening and closing the first flow path, and the second electromagnetic valve being provided on the second flow path and opening and closing the second flow path,
the controller is configured to operate the syringe, the first electromagnetic valve, and the second electromagnetic valve such that a predetermined aspirating, dispensing and discharging liquid operation is performed in the container, the liquid discharging unit, and the flow path system, and
the controller is further configured to determine whether or not an abnormality occurs in the flow path system by
measuring a first liquid amount in the container using the liquid sensor before any of the aspirating liquid operations have been performed;
measuring a second liquid amount in the container using the liquid sensor after the aspirating, dispensing and discharging liquid operation has been performed a plurality of times;
calculating an aspirated liquid amount by subtracting the first liquid amount from the second liquid amount; and
determining the abnormality occurrence when the calculated aspirated liquid amount deviates from a target value by a predetermined threshold amount.

2. The automatic analyzer according to claim 1, wherein the target value is determined based on the aspirating, dispensing and discharging liquid operations being performed a predetermined number of times.

3. The automatic analyzer according to claim 1, further comprising:
a display or printer, wherein
in a case where the controller determines that an abnormality occurs in the flow path system, the controller causes the display or printer to output an alarm.

4. The automatic analyzer according to claim 1, wherein the controller opens the first electromagnetic valve and the second electromagnetic valve to cause the syringe to perform a dispensing operation in a state where the first flow path and the second flow path are filled with liquid from the container, and determines whether or not a flow path included in the flow path system is clogged or an abnormality occurs in the syringe based on a liquid amount measured by the sensor.

5. The automatic analyzer according to claim 4, wherein in a case where the controller determines that a flow path and the syringe in the flow path system are normal, the controller closes the second electromagnetic valve to cause the syringe to perform an aspirating operation of aspirating liquid contained in the container, and determines whether or not an abnormality occurs in the second electromagnetic valve based on a liquid amount measured by the sensor.

6. The automatic analyzer according to claim 5, wherein in a case where the controller determines that the second electromagnetic valve is normal, the controller closes the first electromagnetic valve to cause the syringe to perform a liquid discharging operation of discharging liquid to the liquid discharging unit, and determines whether or not an abnormality occurs in the first electromagnetic valve based on a liquid amount measured by the sensor.

* * * * *